(12) United States Patent
Kato et al.

(10) Patent No.: US 7,293,555 B2
(45) Date of Patent: Nov. 13, 2007

(54) CONTROLLER AND CONTROL METHOD FOR INTERNAL COMBUSTION ENGINE

(75) Inventors: Naoto Kato, Susono (JP); Shuntaro Okazaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/529,428

(22) Filed: Sep. 29, 2006

(65) Prior Publication Data

US 2007/0074709 A1    Apr. 5, 2007

(30) Foreign Application Priority Data

Oct. 4, 2005 (JP) ............................ 2005-291026

(51) Int. Cl.
*F02D 41/00* (2006.01)
*B60T 7/12* (2006.01)

(52) U.S. Cl. .................. 123/679; 123/321; 123/478; 701/103

(58) Field of Classification Search ............... 123/679, 123/478, 497, 321, 345, 347, 90.15, 494, 123/704; 701/103, 104, 105
See application file for complete search history.

(56) References Cited

U.S. PATENT DOCUMENTS

| | | | |
|---|---|---|---|
| 4,932,376 A | 6/1990 | Linder et al. | |
| 6,920,851 B2* | 7/2005 | Machida et al. | 123/90.16 |
| 6,922,988 B2* | 8/2005 | Yamaguchi et al. | 60/286 |
| 7,051,725 B2* | 5/2006 | Ikemoto et al. | 123/673 |
| 2002/0112467 A1* | 8/2002 | Uranishi | 60/277 |
| 2004/0200464 A1* | 10/2004 | Ikemoto | 123/673 |
| 2005/0022513 A1* | 2/2005 | Kitahara | 60/285 |
| 2005/0022797 A1* | 2/2005 | Ikemoto et al. | 123/673 |
| 2006/0137667 A1 | 6/2006 | Ketterer et al. | |

FOREIGN PATENT DOCUMENTS

| | | |
|---|---|---|
| DE | 38 02 274 A1 | 8/1989 |
| DE | 102 44 539 A1 | 4/2004 |
| JP | A 64-15449 | 1/1989 |
| JP | A 64-24142 | 1/1989 |
| WO | WO 2004/074663 A1 | 9/2004 |

* cited by examiner

*Primary Examiner*—John T. Kwon
(74) *Attorney, Agent, or Firm*—Oliff & Berridge, PLC

(57) ABSTRACT

A controller approximates an output characteristic of an air flow meter using at least one parameter, and approximates a characteristic of a fuel injection characteristic of an injector using at least one parameter. These parameters are determined and updated based on an exhaust air-fuel ratio acquired by an air-fuel ratio sensor disposed in an exhaust passage, so that the exhaust air-fuel ratio approaches a target air-fuel ratio.

12 Claims, 10 Drawing Sheets

$Ga = a1 \cdot Vg^2 + b1 \cdot Vg + c1$

INTAKE AIR AMOUNT Ga

AIR FLOW METER OUTPUT VOLTAGE Vg $Fi = (a2 \cdot \tau + b2) \cdot K$

FUEL INJECTION AMOUNT Fi

VALVE OPENING TIME $\tau$

CONTROLLER AND CONTROL METHOD FOR INTERNAL COMBUSTION ENGINE

INCORPORATION BY REFERENCE

The disclosure of Japanese Patent Application No. 2005-291026 filed on Oct. 4, 2005 including the specification, drawings and abstract is incorporated herein by reference in its entirety.

BACKGROUND OF THE INVENTION

1. Field of the Invention

The present invention relates to a controller and a control method for an internal combustion engine.

2. Description of Related Art

In an internal combustion engine using a fuel injection valve (injector) to inject fuel, the opening time of the injector is generally determined by the following procedure. A value output by an air flow meter in response to an amount of air flow passing through the air intake passage (hereinafter "intake air amount") and a pre-established relationship between this air flow meter output value and the intake air amount (specifically, a table or map or the like that establishes the relationship) are used to determine (measure) the intake air amount. The intake air amount and engine rotational speed are then used to determine the amount of air to be taken into the combustion chamber during the intake stroke (hereinafter "in-cylinder intake air amount").

Based on the in-cylinder intake air amount, the amount of fuel to be injected from the injector (hereinafter "fuel injection amount") for the purpose of causing the air-fuel ratio (hereinafter sometimes "air-fuel ratio") of the gas mixture supplied to the engine to coincide with a target air-fuel ratio is determined. The fuel injection amount and a pre-established relationship between the fuel injection amount and the injector opening time (specifically, a table or map or the like that establishes the relationship) are used to determine the opening time of the injector. As a result, by opening the injector valve just for this injector valve opening time, the amount of fuel injected from the injector is the amount required so that the air-fuel ratio is made to coincide with a target air-fuel ratio.

The above-described relationship between the air flow meter output value and the intake air amount (that is, the output characteristic of the air flow meter) inevitably exhibits variations caused, for example, by differences between individual air flow meters and by changes due to aging. In the same manner, the relationship between the fuel injection amount and the injector valve opening time (that is, the fuel injection characteristic of the injector) inevitably exhibits variations caused, for example, by differences between individual injectors and by changes due to aging.

The intake air amount and injector valve opening time established by the above-described table or the like that does not take into consideration these variations can therefore include errors. Because of these errors, the amount of fuel injected from the injector differs from the amount of fuel required so that the air-fuel ratio coincides with the target air-fuel ratio and, as a result, there is a problem of deviation of the air-fuel ratio from the target air-fuel ratio. Hereinafter this intake air amount error and valve opening time error are called "air flow meter output characteristic error" and "injector fuel injection characteristic error," respectively, and these errors are sometimes collectively referred to as "air flow meter and injector error."

For this reason, an apparatus discussed in Japanese laid-open patent application publication 64-24142 (1989), taking note of the difference between the trend of the error in the air flow meter output characteristic and the trend of the error in the injector fuel injection characteristic with respect to engine load (in-cylinder intake air amount), determines the correction proportion when correcting the air flow meter output characteristic and the injector fuel injection characteristic based on the engine load. That is, an attempt is made to suppress the deviation of the air-fuel ratio from the target air-fuel ratio caused by the air flow meter and injector error by varying the proportion between the degree of correction of the air flow meter output characteristic and the degree of correction of the injector fuel injection characteristic in response to the engine load.

In actuality, however, the error trend of the fuel injection characteristic, the error trend of the air flow meter output characteristic, and the injector fuel injection vary freely and independently due to various other causes, and not due to only the engine load. In the apparatus described in the above-cited reference, therefore, which determines the correction proportion of the air flow meter output characteristic and the injector fuel injection characteristic based on only the engine load, there are cases in which the deviation of the air-fuel ratio from the target air-fuel ratio caused by air flow meter and injector error is not suppressed.

SUMMARY OF THE INVENTION

The present invention provides an internal combustion engine controller and an internal combustion engine control method that effectively suppresses deviation of the air flow ratio from the target air-fuel ratio that is caused by the air flow meter and injector error.

The internal combustion engine controller of the present invention is applied to an internal combustion engine that has an air flow meter that outputs a value that is responsive to an intake air amount that is the amount of air passing through an air intake passage of the internal combustion engine, an air-fuel ratio sensor, disposed in an exhaust passage of the internal combustion engine, detecting an exhaust air-fuel ratio that is an air-fuel ratio of gas passing through the exhaust air passage, and an injector that injects fuel by opening a valve. In the case in which a catalyst (three-way catalyst) is provided in the exhaust air passage, the air-fuel ratio sensor can be provided in the exhaust air passage upstream from the catalyst, and can also be a so-called "limit-current type oxygen concentration sensor."

The controller of the present invention has an air flow meter approximator, an injector approximator, a valve opening time determiner, a parameter determiner, and a setter.

The air flow meter approximator approximates an output characteristic of the air flow meter by using at least one first parameter. The output characteristic of the air flow meter approximated by the air flow meter approximator can be adjusted responsive to the first parameter. The air flow meter approximator can, for example, approximate the characteristic of the intake air amount (true intake air amount) with respect to the air flow meter output value as the air flow meter output characteristic.

The injector approximator approximates a fuel injection characteristic of the injector using at least one second parameter. The fuel injection characteristic of the injector approximated by the injector approximator is adjusted responsive to the second parameter (without relation to the first parameter). The injector approximator can, for example, approximate the characteristic of the fuel injection amount (true fuel injection amount) injected from the injector with respect to the valve opening time of the injector as the fuel injection characteristic of the injector.

The valve opening time determiner determines the valve opening time of the injector based on the output value of the air flow meter, the output characteristic of the air flow meter approximated by the air flow meter approximator, and the fuel injection characteristic of the injector approximated by the injector approximator. The valve opening time is the time for the purpose of injecting fuel of an amount required so that the air-fuel ratio of the gas mixture supplied to the internal combustion engine coincides with a target air-fuel ratio.

According to the valve opening time determiner, for example, the intake air amount is determined from the output value of the air flow meter and from the output characteristic of the air flow meter approximated as noted above. The in-cylinder intake air amount, and therefore the fuel injection amount, which is the amount of fuel to be injected, for the purpose of causing the air-fuel ratio to coincide with a target air-fuel ratio, is determined from the intake air amount and from the operating speed of the engine. The valve opening time of the injector for the purpose of injecting the fuel of the above fuel injecting amount is determined from the fuel injection amount and from the fuel injection characteristic of the injector approximated as noted above. As a result, an amount of fuel required so that the air-fuel ratio coincides with the target air-fuel ratio is injected from the injector.

The parameter determiner determines the first parameter (first determined parameter) and the second parameter (second determined parameter) for the purpose of causing the exhaust air-fuel ratio to approach the target air-fuel ratio, based on the exhaust air-fuel ratio detected by the air-fuel ratio sensor. The parameter determiner, for example, based on a combination of the exhaust air-fuel ratio detected by the air-fuel ratio sensor, the output value of the air flow meter, and the valve opening time of the injector determined by the valve opening time determiner, determines a first determined parameter and a second determined parameter for the purpose of causing the exhaust air-fuel ratio to approach the target air-fuel ratio.

Additionally, the parameter determiner may apply the method of least squares to the difference between the exhaust air-fuel ratio and the target air-fuel ratio, based on the combinations at a plurality of points in time, and may determine the first parameter and the second parameter for the purpose of causing the exhaust air-fuel ratio to approach the target air-fuel ratio. The first determined parameter and the second determined parameter are determined by the parameter determiner for the purpose of causing the exhaust air-fuel ratio acquired by the air-fuel ratio sensor (and therefore the air-fuel ratio of the gas mixture supplied to the engine) to approach the target air-fuel ratio.

The setter sets first determined parameter determined the parameter determined as the first parameter used by the air flow meter approximator and sets second determined parameter determined by the parameter determiner as the second parameter used by the injector approximator.

By doing this, the output characteristic of the air flow meter approximated by the air flow meter approximator and the fuel injection characteristic of the injector approximated by the injector approximator, and therefore the valve opening time (and therefore the fuel injection amount) of the injector determined by the valve opening time determined based on these characteristics are adjusted so that the air-fuel ratio approaches the target air-fuel ratio. It is therefore possible to suppress the deviation of the air-fuel ratio from the target air-fuel ratio that is caused by the above-described air flow and injector error.

The air flow meter approximator may approximate the characteristic of the intake air amount with respect to the output value of the air flow meter using a second-order polynomial, and may use the coefficient of the terms of the second-order polynomial as the first parameters. In this case, the second-order polynomial may be a second-order polynomial in the output value of the air flow meter, and may alternatively be a second-order polynomial in the intake air amount.

It is generally known that the characteristic of the intake air amount with respect to the output value of an air flow meter can be approximated with relatively good accuracy by a second-order polynomial. Therefore if the coefficients of the terms of the second-order polynomial are determined so that the exhaust air-fuel ratio obtained from the air-fuel ratio sensor (and therefore the air-fuel ratio of the gas mixture supplied to the engine) approaches the target air-fuel ratio, it is possible to make the error in the output characteristic of the air flow meter small, and cause the air-fuel ratio to approach the target air-fuel ratio. The above-noted construction is based on this knowledge. Accordingly, it is possible to compensate for the error in the output characteristic of the air, flow meter using a second-order polynomial, with a relatively small calculation load on a microcomputer.

The air flow meter approximator may have a storage section into which a pre-established relationship between the output value of the air flow meter and the intake air amount is stored. The air flow meter approximator may approximate the characteristic of the deviation of a reference intake air amount, which is an intake air amount that is acquired from the output value of the air flow meter and the stored relationship, with respect to the true intake air amount, as the output characteristic of the air flow meter.

In this case, the storage section stores a table or a function or the like that establishes a relationship between the output value of the air flow meter and the intake air amount, which has been priorly adapted and determined by, for example, an experiment, simulation or the like. The "characteristic of deviation of a reference intake air amount with respect to the true intake air amount" may be a characteristic of the deviation with respect to the output value of the air flow meter, and may alternatively be the characteristic of the deviation with respect to the reference intake air amount In accordance with the above-noted configuration as well, the characteristic of the intake air amount (true intake air amount) with respect to the output value of the air flow meter is approximated from the relationship stored in the above-noted storage section and from the "characteristic of deviation of a reference intake air amount with respect to the true intake air amount."

In this case, the air flow meter approximator may approximate the characteristic of the deviation of the reference intake air amount with respect to the true intake air amount using a first-order polynomial, and the coefficients of the terms of the first-order polynomial may be used as the first parameters. In this case, the first-order polynomial can be a first-order polynomial in the output value of the air flow meter, and can alternatively be a first-order polynomial in the reference intake air amount.

The characteristic of "deviation of a reference intake air amount with respect to the true intake air amount" with respect to the output value of the air flow meter or the reference intake air amount is often approximated with relatively good accuracy by a first-order polynomial. Therefore, if the coefficients of the terms of this first-order polynomial are determined so that the air-fuel ratio approaches the target air-fuel ratio, it is possible to make the error in the output characteristic of the air flow meter small and to cause the air-fuel ratio to approach the target air-fuel ratio. The above configuration is based on this knowledge. By doing this, it is possible to compensate for the error in the output characteristic of the air flow meter using a first-order polynomial, with an even further reduced calculation load on the microcomputer.

In the controller of the present invention as described above, the injector approximator can approximate the characteristic of the fuel injection amount with respect to the valve opening time of the injector using a first-order polynomial, and can use the coefficients of the terms of the first-order polynomial as the second parameters. In this case, the first-order polynomial can be a first-order polynomial in the valve opening time of the injector, and can alternatively be a first-order polynomial in the fuel injection amount.

It is known that the characteristic of the fuel injection amount with respect to the valve opening time of an injector is generally approximated with relatively good accuracy by a first-order polynomial. Therefore, if the coefficients of the terms of the first-order polynomial are determined as values so that the air-fuel ratio approaches the target air-fuel ratio, it is possible to make the error in the fuel injection characteristic of the injector small and to cause the air-fuel ratio to approach the target air-fuel ratio. The above configuration is based on this knowledge. Accordingly, it is possible to compensate for the error in the fuel injection characteristic of the injector using a first-order polynomial, with a small calculation load on the microcomputer.

In the controller of the present invention as described above, the injector approximator may have a storage section into which a pre-established relationship between the valve opening time of the injector and the fuel injection amount is stored, and the injector approximator may approximate the characteristic of the deviation of a reference fuel injection amount with respect to the true fuel injection amount, as the fuel injection characteristic of the injector. The reference fuel injection amount is a fuel injection amount that is acquired from the valve opening time of the injector and from the stored relationship.

In this case, the storage section stores a table or a function or the like that establishes a relationship between the valve opening time of the injector and the fuel injection amount, which has been priorly adapted and determined by, for example, experimentation or simulation or the like. The "characteristic of deviation of a reference fuel injection amount with respect to the true fuel injection amount" may be the characteristic of this deviation amount with respect to the valve opening time of the injector, and may alternatively be the characteristic of this deviation amount with respect to the reference fuel injection amount.

In accordance with the above-noted configuration as well, the characteristic of the fuel injection amount (true fuel injection amount) with respect to the valve opening time of the injector is approximated from the above-noted stored relationship and from the "characteristic of deviation of a reference fuel injection amount with respect to the true fuel injection amount."

In this case, the injector characteristic approximator approximates the characteristic of the deviation of the reference fuel injection amount with respect to the true fuel injection amount using a first-order polynomial, and the coefficients of the terms of the first-order polynomial may be used as the second parameters.

The characteristic of the "deviation of a reference fuel injection amount with respect to the true fuel injection amount" is often approximated with relatively good accuracy by a first-order polynomial. Therefore, if the coefficients of the terms of this first-order polynomial are determined so that the air-fuel ratio approaches the target air-fuel ratio, it is possible to make the error in the fuel injection characteristic of the injector small and to cause the air-fuel ratio to approach the target air-fuel ratio. The above-noted configuration is based on this knowledge. By doing this, it is possible to compensate for the error in the fuel injection characteristic of the injector using a first-order polynomial, with a reduced calculation load on the microcomputer.

BRIEF DESCRIPTION OF THE DRAWINGS

The foregoing and further objects, features, and advantages of the present invention will become apparent from the following description of preferred embodiments with reference to the accompanying drawings, wherein like numerals are used to represent like elements, and wherein.

DETAILED DESCRIPTION OF THE PREFERRED EMBODIMENTS

Various embodiments of the controller for an internal combustion engine according to the present invention are described below, with reference to the accompanying drawings. This controller is an injector valve opening time controller that controls the valve opening time of an injector, and is also a fuel injection amount controller that controls the amount of fuel injected in the engine.

Figure 1:
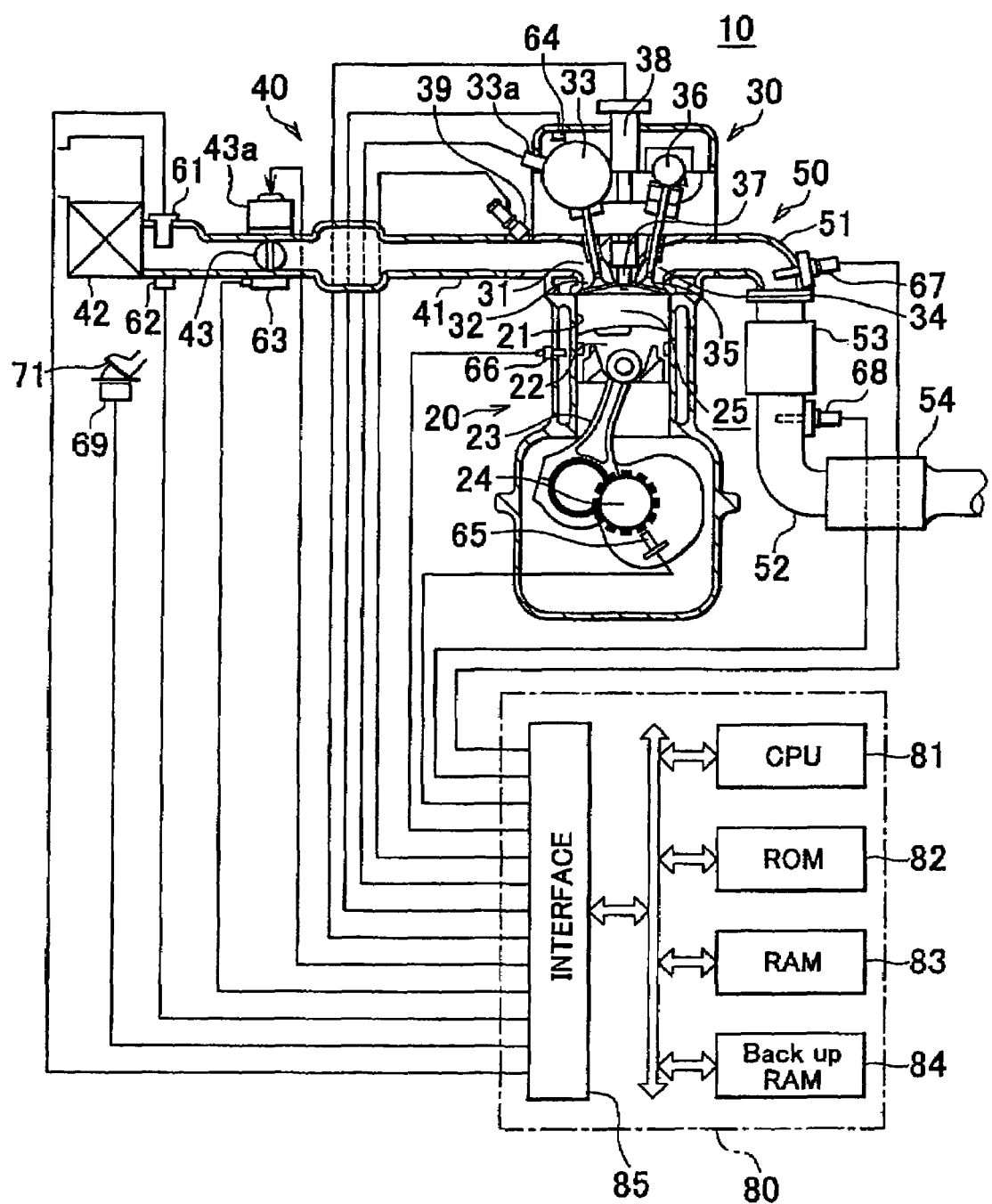
FIG. 1 is a drawing showing a simplified view of a controller according to a first embodiment of the present invention as applied to an internal combustion engine.

FIG. 1 shows the general configuration of a system in which the controller according to the first embodiment of the present invention is applied to a 4-cycle, spark-ignited, 4-cylinder internal combustion engine 10. Although only one cylinder is shown in FIG. 1, the other cylinders have the same configuration.

The internal combustion engine 10 includes a cylinder block assembly 20, which includes a cylinder block, a cylinder block lowercase, and an oil pan and the like, a cylinder head 30 fixed upon the cylinder block assembly 20, an air intake system 40 for supplying a gasoline gas mixture to the cylinder block assembly 20, and an exhaust system 50 for ejecting exhaust gas from the cylinder block assembly 20 to the outside.

The cylinder block assembly 20 includes a cylinder 21, a piston 22, a connecting rod 23, and a crankshaft 24. The piston 22 moves reciprocally within the cylinder 21, the reciprocating motion of the piston 22 being transmitted to the crankshaft 24 via the connecting rod 23, thereby causing the crankshaft 24 to rotate. The cylinder 21 and the head of the piston 22 form a combustion chamber 25, together with the cylinder head 30.

The cylinder head 30 has an intake port 31 that communicates with the combustion chamber 25, an intake valve 32 that opens and closes the intake port 31, an intake camshaft that drives the intake valve 32, a variable intake timing unit 33 that continuously varies the phase angle and lift amount of the intake camshaft, an actuator 33a of the variable intake timing unit 33, an exhaust port 34 that communicates with the combustion chamber 25, an exhaust valve 35 that opens and closes the exhaust port 34, an exhaust camshaft 36 that drives the exhaust valve 35, a spark plug 37, an igniter 38 that includes an ignition coil that generates a high voltage applied to the spark plug 37, and an injector 39 that injects fuel into the intake port 31. The injector 39 is a normally closed electromagnetic valve that opens only when it is electrically powered.

The air intake system 40 has an intake pipe 41 that includes an intake manifold that communicates with the intake port 31 and that forms an intake passage together with the intake port 31, an air filter 42 provided at an end part of the intake pipe 41, and a throttle valve 43 within the intake pipe 41 that can vary the opening cross-sectional area of the intake passage. The throttle valve 43 is rotationally driven within the intake pipe 41 by a throttle valve actuator 43a such as a DC motor or the like.

The exhaust system 50 has an exhaust manifold 51 that communicates with the exhaust port 34, an exhaust pipe 52 connected to the exhaust manifold 51, an upstream catalyst (three-way catalyst) 53 disposed in the exhaust pipe 5, and a downstream catalyst (three-way catalyst) 54 disposed in the exhaust pipe 52 farther downstream from the upstream catalyst 53. The exhaust port 34, the exhaust manifold 51, and the exhaust pipe 52 form the exhaust passage.

This system also has a hotwire type air flow meter 61, an air intake temperature sensor 62, a throttle position sensor 63, a cam position sensor 64, a crankshaft position sensor 65, a water temperature sensor 66, an air-fuel ratio sensor 67, an oxygen concentration sensor 68, and an accelerator opening sensor 69.

The air flow meter 61 outputs a signal (output voltage Vg) responsive to the mass flow (intake air amount) G1 (g/s) of the intake air flowing within the intake pipe 41. The air intake temperature sensor 62 detects the temperature of the air intake and outputs a signal representing the air intake temperature THA. The throttle position sensor 63 detects the opening (throttle valve opening) of the throttle valve 43, and outputs a signal representing the throttle valve opening TA.

The cam position sensor 64 generates a signal (G2 signal) having one pulse for each 90° of rotation of the intake camshaft (that is, each time the crankshaft 24 rotates 180°). The crankshaft position sensor 65 outputs a signal having a narrow pulse for each 10° of rotation of the crankshaft 24 and having a wide pulse for each 360° of rotation of the crankshaft 24. This signal represents the engine rotational speed NE (rpm). The water temperature sensor 66 detects the temperature of the cooling water in the internal combustion engine, and outputs a signal representing the cooling water temperature THW.

Figure 2:
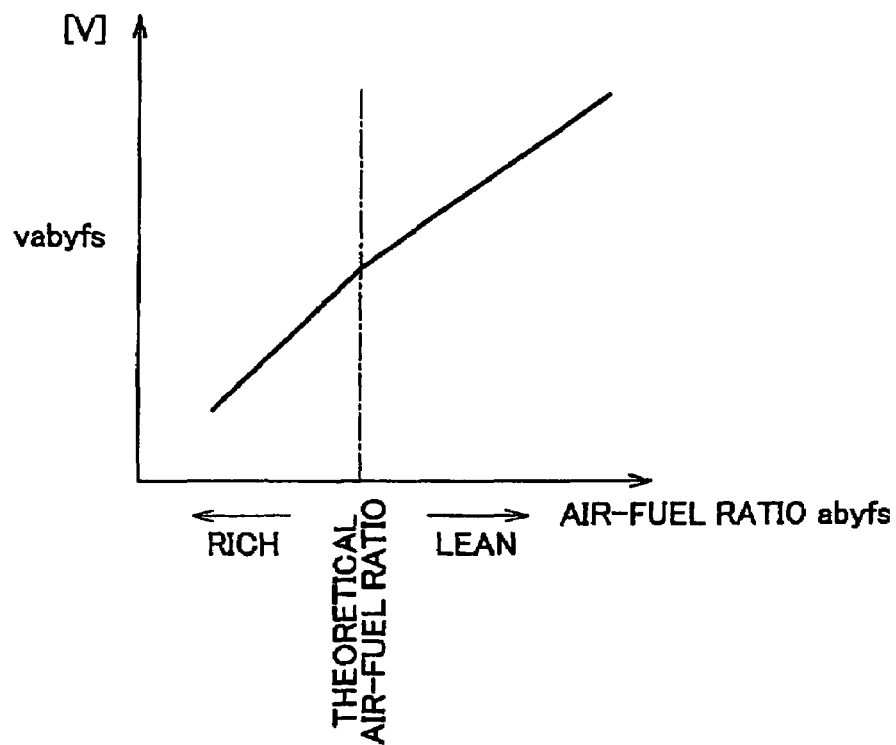
FIG. 2 is a graph showing a relationship between the output of the air-fuel ratio sensor shown in FIG. 1 and the air-fuel ratio.

The air-fuel ratio sensor 67 is disposed within the exhaust passage on the upstream side from the upstream catalyst 53. The air-fuel ratio sensor 67 is, for example, a "limit current type oxygen concentration sensor" that detects the air-fuel ratio of the exhaust gas flowing into the upstream catalyst 53 and, as shown in FIG. 2, outputs a signal vabyfs that is responsive to the detected air-fuel ratio (detected air-fuel ratio abyfs, exhaust air-fuel ratio).

Figure 3:
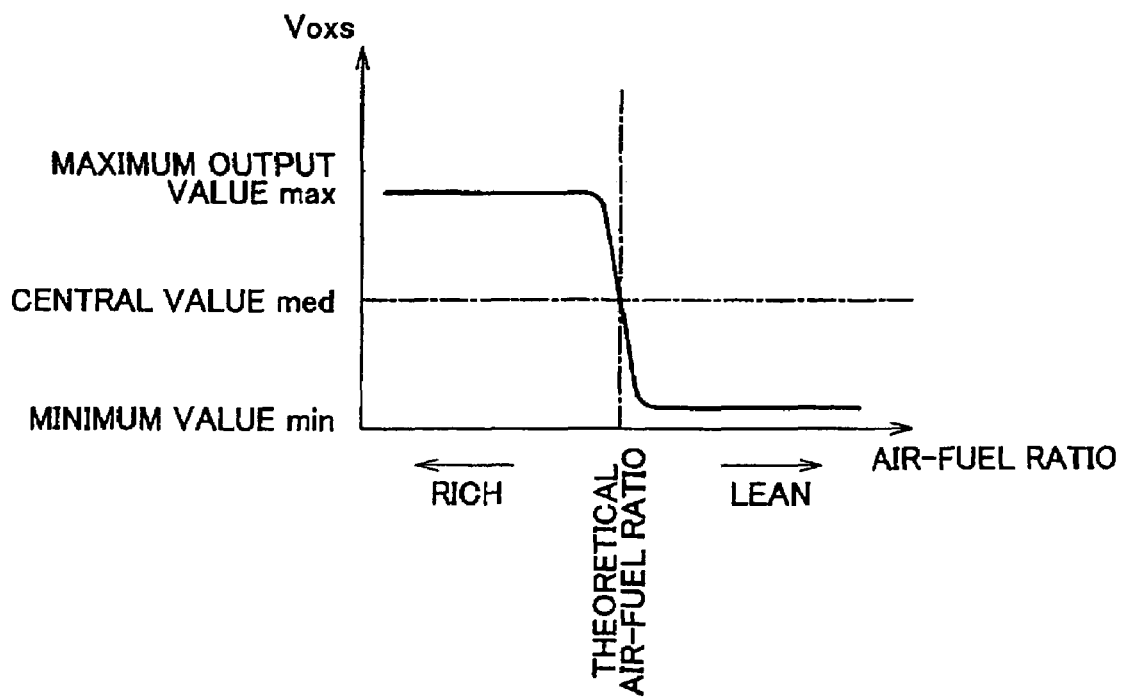
FIG. 3 is a graph showing a relationship between an output of the oxygen concentration sensor shown in FIG. 1 and the air-fuel ratio.

The oxygen concentration sensor 68 is disposed within the exhaust passage at a position that is downstream from the upstream catalyst 53 and upstream from the downstage catalyst 54. The oxygen concentration sensor 68 is, for example, a solid electrolytic type sensor (a known density cell type oxygen sensor that uses stabilized zirconia). As shown in FIG. 3, the oxygen concentration sensor 68 outputs a maximum output value max and a minimum output value min when the air-fuel ratio of the exhaust gas is richer and leaner, respectively, than the theoretical air-fuel ratio, and outputs a value (central value) med that is substantially at the center between the maximum output value max and the minimum output value min when the air-fuel ratio of the exhaust gas is at the theoretical air-fuel ratio.

The accelerator opening sensor 69 outputs a signal that represents the actuation amount Accp of the accelerator pedal 71 operated by the driver.

The electrical control unit 80 is a microcomputer formed by such elements as a CPU 81, a ROM 82 into which are priorly stored a program executed by the CPU 81, a table (map, function) and constants and the like, a RAM 83 into which are temporarily stored data as required by the CPU 81, a backup RAM 84 that stores data when the power supply is switched on and that also holds stored data when the power supply is switched off, and an interface 85 that includes an A/D converter. These elements are mutually connected via a bus.

The interface 85 is connected to the sensors 61 through 69, supplies signals output from the sensors 61 through 69 to the CPU 81 and, in response to an instruction from the CPU 81, sends drive signals to the actuator 33a of the variable intake timing unit 33, the igniter 38, the injector 39, and the throttle valve actuator 43a.

Next, the method of determining the valve opening time (powered time) $\tau$ of the injector 39 by the controller configured as described above (hereinafter sometimes called "apparatus") will be described in general. The characteristic of the intake air amount Ga with respect to the output voltage Vg from the air flow meter 61 is generally known to be approximated with relatively good accuracy using a second-order polynomial in the output voltage Vg.

Figure 4:
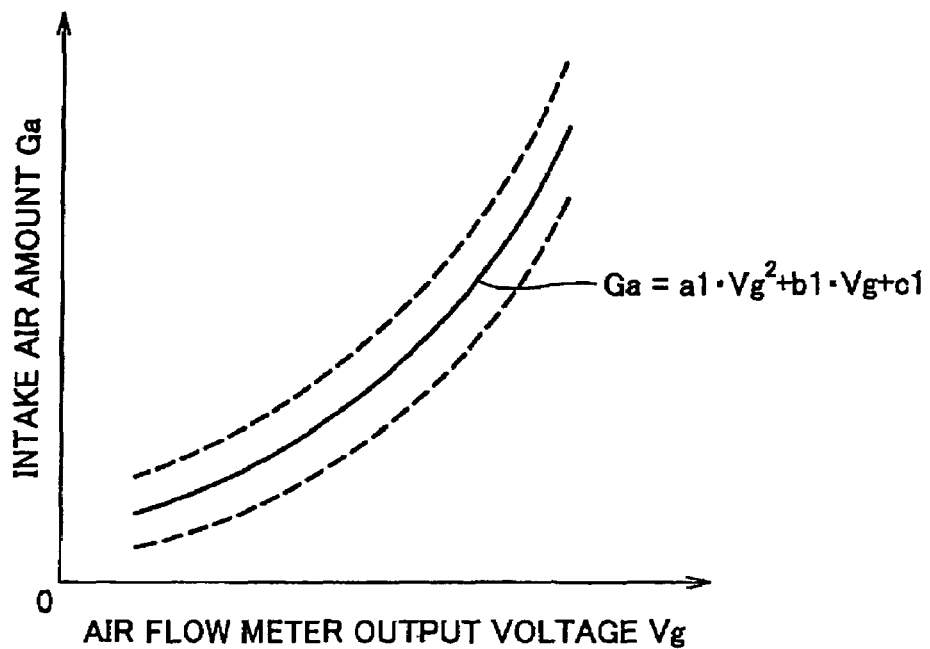
FIG. 4 is a graph showing a relationship between an output voltage of the air flow meter and the intake air amount, as an example of the output characteristic of an air flow meter applied by the controller shown in FIG. 1.

As shown in FIG. 4, therefore, the intake air amount Ga is approximated by the following equation (1), which is a second-order polynomial in the output voltage Vg from the air flow meter 61, using the first parameters a1, b1, and c1. Therefore, the (true) intake air amount Ga is acquired based on the output voltage Vg of the air flow meter 61 and this equation (1).

$$Ga = a1 \cdot Vg2 + b1 \cdot Vg + c1 \tag{1}$$

Equation (1) is an example of the output characteristic of the air flow meter 61 in the form of an approximating equation that represents the characteristic of the intake air amount Ga with respect to the output voltage Vg of the air flow meter 61. As shown by the dashed lines in FIG. 4, the output characteristic of the air flow meter 61 represented by Equation (1) is adjusted by the first parameters a1, b1, and c1.

If the intake air amount Ga is obtained, the amount of air to be taken into the combustion chamber 25 (in-cylinder intake air amount Mc) during the intake stroke is determined from this intake air amount Ga and the engine rotational speed NE. The amount of fuel to be injected from the injector 39 (fuel injection amount Fi) in order to have the air-fuel ratio coincide with the target air-fuel ratio abyfr (normally the theoretical air-fuel ratio) is determined based on this in-cylinder intake air amount Mc.

Figure 5:
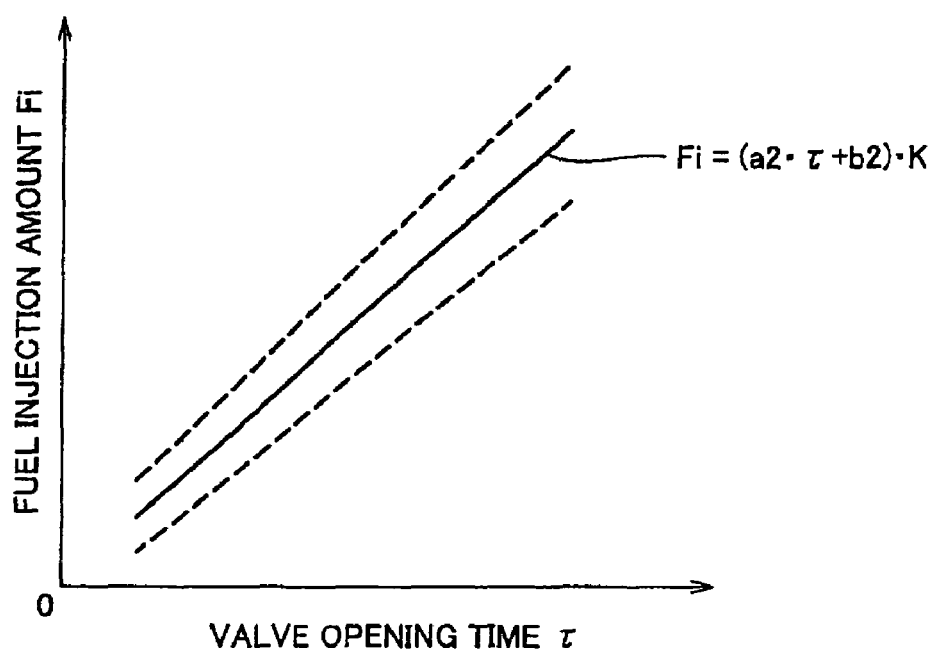
FIG. 5 is a graph showing a relationship between an injector valve opening time and an amount of injected fuel, as an example of the fuel injection characteristic of an injector applied used in the controller shown in FIG. 1.

The characteristic of the fuel injection amount Fi with respect to the valve opening time $\tau$ of the injector 39 is known to generally be approximated with relatively good accuracy by a first-order polynomial in the valve opening time $\tau$. As shown in FIG. 5, therefore, the fuel injection amount Fi is approximated by the following equation (2), which is a first-order polynomial in the valve opening time $\tau$ of the injector 39, using the second parameters a2 and b2. Thus, the valve opening time $\tau$ of the injector 39 is determined based on the fuel injection amount Fi determined as noted above and Equation (2). In Equation (2), K is a coefficient (constant) for the purpose of converting the units from "time" to "mass."

$$Fi = (a2 \cdot \tau + b2) \cdot K \tag{2}$$

Equation (2) is an example of the fuel injection characteristic of the injector in the form of an approximating equation that represents the characteristic of the fuel injection amount Fi with respect to the valve opening time $\tau$ of the injector 39. As shown by the dashed lines in FIG. 5, the fuel injection characteristic of the injector 39 represented by Equation (2) is adjusted by the second parameters a2 and b2.

Following this type of procedure, the apparatus determines the valve opening time $\tau$ of the injector 39 for the purpose of injecting the fuel injection amount Fi of fuel from the injector 39. Additionally, the apparatus determines and updates the first parameters a1, b1, and c1 and the second parameters a2 and b2 each prescribed amount of time, as described later, so that the air-fuel ratio approaches the target air-fuel ratio abyfr. This is the general description of the method by which the apparatus determines the valve opening time $\tau$ of the injector 39.

Next, the detailed operation of the apparatus configured as noted above will be described, with references to FIG. 6 through FIG. 8, which show flowcharts of the routines (programs) executed by the CPU 81 of the electrical controller 80.

Figure 6:
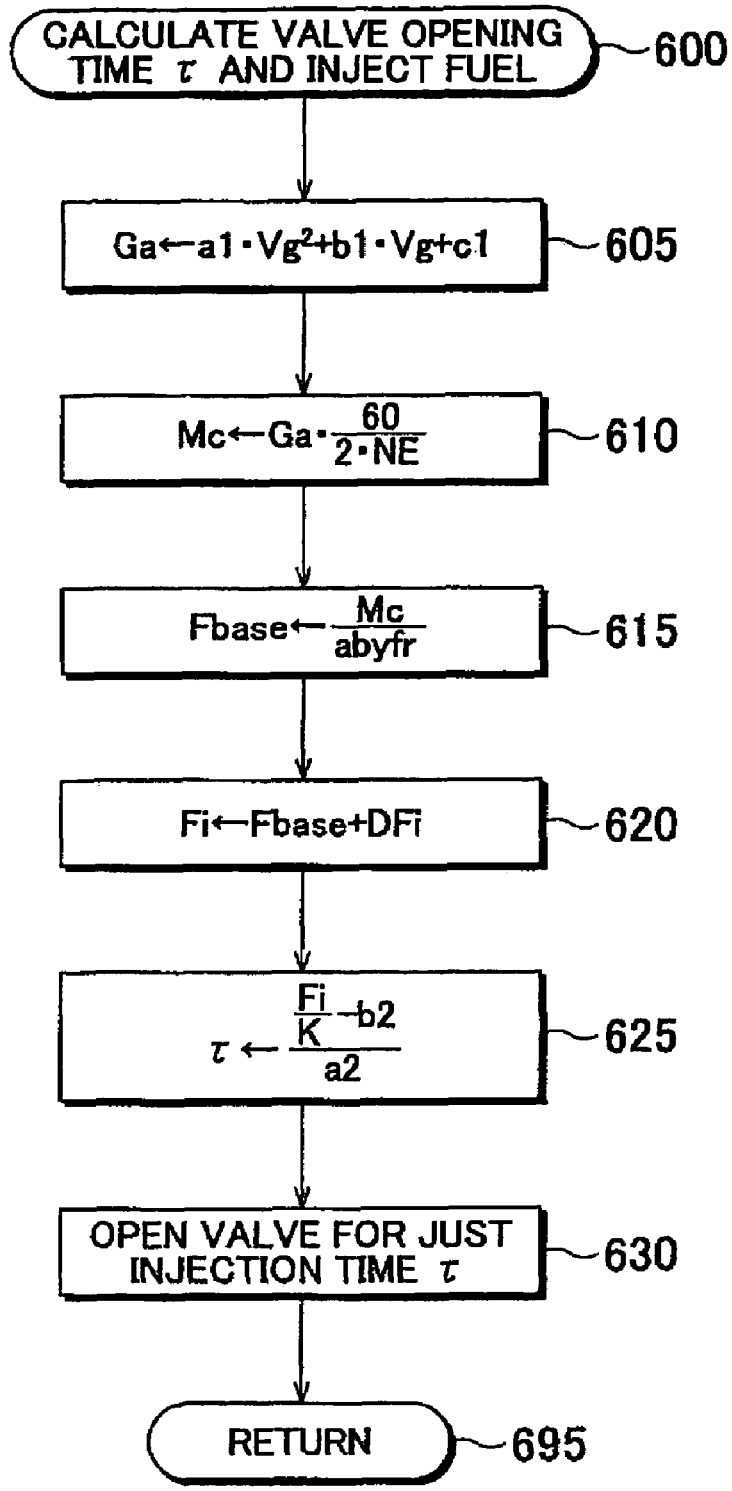
FIG. 6 is a flowchart showing a routine executed by the CPU shown in FIG. 1 for the purpose of performing calculation of the valve opening time and performing fuel injection.

The CPU 81 executes the routine shown in FIG. 6, which calculates the valve opening time $\tau$ of the injector 39 and issues a fuel injection instruction, repeating the execution each time the crankshaft angle for a prescribed cylinder reaches a prescribed crankshaft angle before the top dead-point (for example, BTDC 90° CA). Therefore, when the crankshaft angle for a prescribed cylinder reaches this prescribed crankshaft angle, the CPU 81 starts processing from step 600 and proceeds to step 605, at which it determines the intake air amount Ga based on output voltage Vg of the current air flow meter 61 and Equation (1). This step 605 is an example of an air flow meter approximator.

Next, the CPU 81 proceeds to step 610, at which the in-cylinder intake air amount Mc is determined based on the intake air amount Ga determined as noted above, the engine rotational speed NE (rpm) at the current point in time, and the equation noted within step 610. The equation noted within step 610 is an equation that converts the intake air amount Ga to the in-cylinder intake air amount Mc in a 4-cycle, 4-cylinder internal combustion engine in which the cylinder going through the intake stroke is switched every 0.5 rotation of the crankshaft 24. The in-cylinder intake air amount Mc is stored in the RAM 83 in association with intake stroke of each cylinder.

The CPU 81 then proceeds to step 615, at which the in cylinder intake air amount Mc determined as noted above is divided by the target air-fuel ratio abyfr so as to determine the basic fuel injection amount Fbase, which is the fuel amount for the purpose of causing the air-fuel ratio to coincide with the target air-fuel ratio. Next, at step 620, the fuel injection amount Fi is set to a value obtained by adding the air-fuel ratio feedback correction amount DFi to the basic fuel injection amount Fbase determined as noted above.

The CPU 81 then proceeds to step 625, at which the valve opening time $\tau$ of the injector 39 is determined based on the fuel injection amount Fi set as noted above, and the equation noted within step 625. The equation noted within step 625 is an equation that solves Equation (2) for the valve opening time $\tau$ of the injector 39. Next, at step 630, after issuing an instruction to the injector 39 of the prescribed cylinder to open the valve for just the amount of valve opening time $\tau$ from a prescribed fuel injection starting time, processing proceeds to step 695, at which the routine is temporarily ended. By doing this, the fuel injection amount Fi corrected by feedback is injected into the cylinder that is going into the intake stroke. In this case, step 625 is an example of an injector approximator and a valve opening time determined. This routine is caused to be executed in the same manner as noted above for the other cylinders as well.

Figure 7:
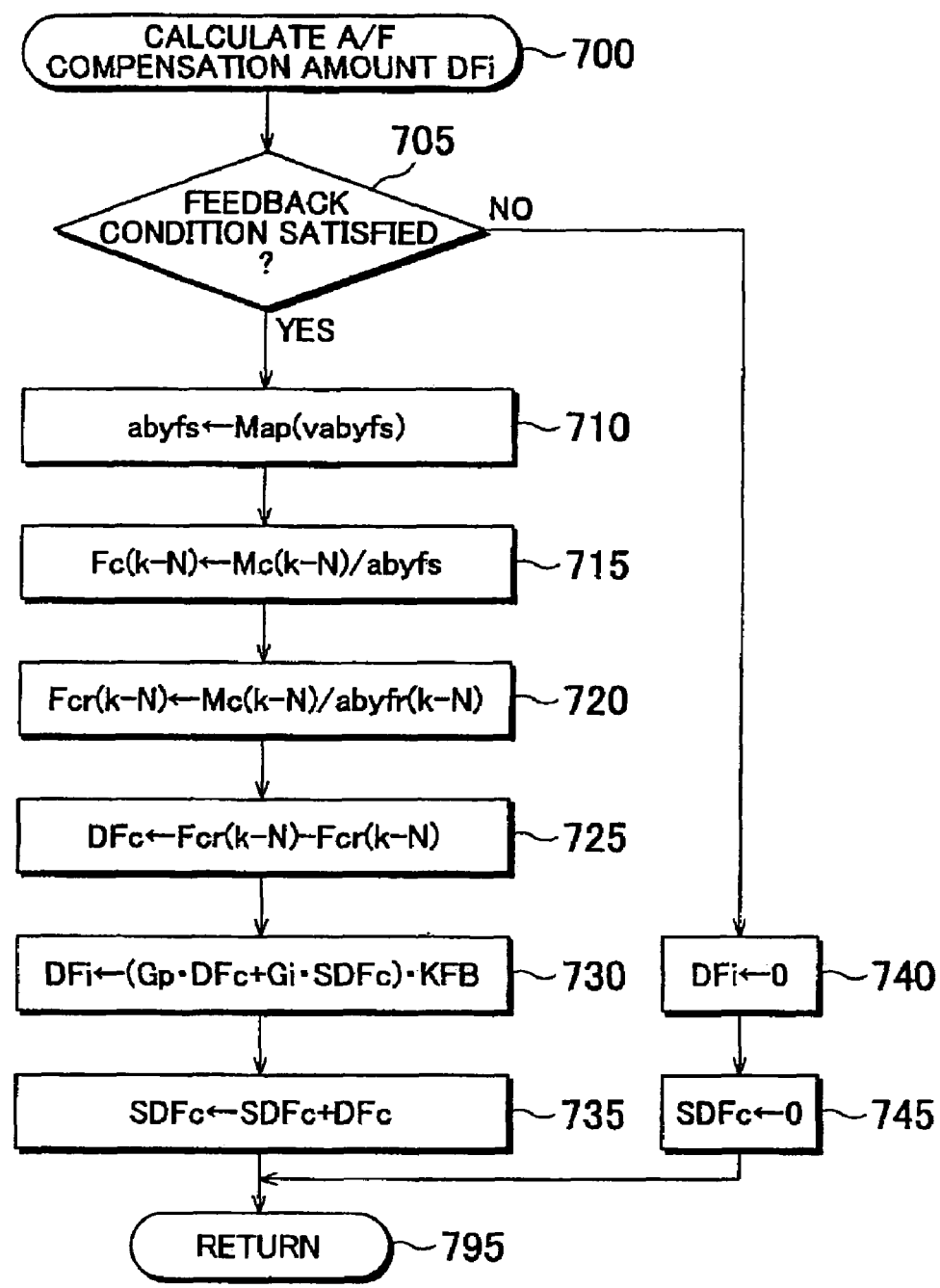
FIG. 7 is a flowchart showing a routine executed by the CPU shown in FIG. 1 for the purpose of calculating the air-fuel ratio feedback correction amount.

Next, the calculation of the above-noted air-fuel ratio feedback correction amount DFi will be described The CPU 81 repeats execution of the routine shown in FIG. 7 each time a prescribed amount of time elapses. That is, when a prescribed time is reached, the CPU 81 starts processing from step 700, and proceeds to step 705, at which a judgment is made as to whether or not a feedback control condition is satisfied. The feedback control condition can be satisfied when, for example, the cooling water temperature THW of the engine detected by the water temperature sensor 66 is at least a prescribed temperature, the intake air amount (load) for each rotation of the engine is greater than a prescribed value, the air-fuel ratio sensor 67 is in an active (excited) condition, and also when the data extraction condition described below does not exist.

Continuing the foregoing description, for the case in which the data extraction condition, to be described later, does not exist and in which the feedback control condition does exist, at step 105 the CPU 81 makes the judgment "Yes" and proceeds to step 710, at which the air-fuel ratio (hereinafter "detected air-fuel ratio abyfs") of the upstream of the upstream catalyst 53 at the current point in time is determined, based on the current output vabyfs from the air-fuel ratio sensor 67 and the map indicated in FIG. 2.

Next, the CPU 81 proceeds to step 715, at which the in-cylinder fuel supply amount Fc (k-N) at N strokes previous to the current point in time is determined by dividing the in-cylinder intake air amount Mc (k-N) of a cylinder that was in the intake stroke N strokes before the current point in time by the above-described detected air-fuel ratio abyfs. The value of N is a value that differs, depending upon, for example, the amount of exhaust from the internal combustion engine and the distance from the combustion chamber 25 to the air-fuel ratio sensor 67.

The in-cylinder fuel supply amount Fc (k-N) for N strokes before the current point in time is determined by the dividing the in-cylinder intake air amount Mc (k-N) for N strokes ago by the detected air-fuel ratio abyfs, because an amount of time corresponding to N strokes is required until the gas mixture combusted in the combustion chamber 25 reaches the air-fuel ratio sensor 67.

The CPU 81 next proceeds to step 720, at which the target in-cylinder fuel supply amount Fcr (k-N) at N strokes before the current point in time is determined by dividing the in-cylinder intake air amount Mc (k-N) at N strokes before the current point in time by the target air-fuel ratio abyfr (k-N) (in this example, the theoretical air-fuel ratio) at N strokes before the current point in time.

The CPU 81 then proceeds to step 725, at which the deviation DFc of the in-cylinder fuel supply amount is set to a value obtained by subtracting the in-cylinder fuel supply amount Fc (k-N) from the target in-cylinder fuel supply amount Fcr (k-N). That is, the deviation amount DFc of the in-cylinder fuel supply amount represents the excess or insufficiency in the fuel supplied to within the cylinder at the point in time N strokes ago. The CPU 81 next proceeds to step 730, at which the air-fuel ratio feedback correction amount DFi is determined by the following Equation (3).

$$DFi = (Gp \cdot DFc + Gi \cdot SDFc) \cdot KFB \quad (3)$$

In Equation (3), Gp is a proportional gain that is set beforehand and Gi is an integral gain that is set beforehand. In the case of Equation (3), the coefficient KFB is made 1. However, it is possible to vary this value, depending upon the engine rotational speed NE and the in-cylinder intake air amount Mc and the like. The value SDFc is the integrated value of deviation DFc of the in-cylinder fuel supply amount, this being updated at the next step 735.

That is, at step 735 the CPU 81 adds the deviation DFc of the in-cylinder fuel supply amount determined at step 725 to the current integrated value SDFc of the deviation DFc of the in-cylinder fuel supply amount and sets this as the new integrated value SDFc of the deviation DFc of the in-cylinder fuel supply amount, after which this routine is temporarily ended at step 795.

By doing the above, the air-fuel ratio feedback correction amount DFi is determined by proportional-integral control, and this air-fuel ratio feedback correction amount DFi is reflected in the injector valve opening time $\tau$ (that is, the fuel injection amount Fi) by step 620 and step 625 of FIG. 6 as described above. As a result, because an excess or insufficiency in the amount of fuel supplied N strokes before the current point in time is compensated for, the average value of the air-fuel ratio (and therefore the air-fuel ratio of the gas flowing into the upstream catalyst 53) is caused to coincide substantially with the target air-fuel ratio abyfr (theoretical air-fuel ratio).

If, for example, the data extraction condition to be described below exists, that is, if the feedback control condition does not exist at the judgment made at step 705, the CPU 81 makes the "No" judgment at step 705, and proceeds to step 740, at which it sets the value of the air-fuel ratio feedback correction amount DFi to 0. Next, at step 745, as preparation for the subsequent restarting of air-fuel ratio feedback control, the integrated value SDFc of the in-cylinder fuel supply amount deviation is initialized to 0, after which processing proceeds to step 795, at which the routine is temporarily ended. In this manner, when the feedback control condition does not exist, the air-fuel ratio feedback correction amount DFi is set to 0, and air-fuel ratio (basic fuel injection amount Fbase) is not corrected.

Next, the determination of the first and second parameters will be described. The CPU 81 repeatedly executes the routine shown in FIG. 8 each time a prescribed amount of time elapses. That is, when a prescribed time is reached, the CPU 81 starts processing from step 800 and proceeds to step 805, at which a judgment is made as to whether or not the data extraction condition exists. If the judgment is "No," processing proceeds immediately to step 895, at which point the routine is temporarily ended.

The data extraction condition is a condition for the purpose of acquiring the combined data of the output voltage Vg of the air flow meter 61, valve opening time $\tau$ of the injector 39, the calculated air-fuel ratio abyfc to be described below, and the detected air-fuel ratio abyfs, which is used to determine the first and second parameters a1, b1, c1, a2, and b2. The data extraction condition exists, for example, when the condition in which the variation span of the engine rotational speed NE is less than a prescribed value and the variation span of the accelerator pedal actuation amount ACCD is less than a prescribed value persists for at least a prescribed amount of time (the condition that is judged to be steady-state operation), and also when at least a prescribed amount of time has elapsed from the determination of the first and second parameters at the previous time (the point at which step 850, to be described below, is executed).

If we continue the description with the assumption that there has been a change from the state in which the data extraction condition does not exist to the state in which it does exist, the CPU 81 makes the judgment of "Yes" at step 805 and proceeds to step 810, at which the counter N value is incremented by 1. The counter N value is the number of acquisitions of the combined data. Because the counter N value is reset to 0 at step 855, to be described below, at which point the previous determination of the first and second parameters was made, at this point the counter N value becomes 1.

Next, the CPU 81 proceeds to step 815, which performs processing that is similar to the earlier step 605, and determines the intake air amount Gac (hereinafter "calculated intake air amount") for calculation of a calculated air-fuel ratio, based on the current output voltage Vg of the air flow meter 61 and the above-noted Equation (1). Next, the CPU 81 proceeds to step 820, which performs processing that is similar to the earlier step 610, and determines the in-cylinder intake air amount Mcc (hereinafter "calculated in-cylinder intake air amount") for calculation of the calculated air-fuel ratio, based on the calculated intake air amount Gac, the current engine rotational speed NE, and the equation noted within step 820.

Next, the CPU 81 proceeds to step 825 and determines the fuel injection amount Fic (hereinafter "calculated fuel injection amount") for calculation of the calculated air-fuel ratio, based on the latest injector 39 valve opening time $\tau$ determined previously at step 625 and the Equation (2). The CPU 81 then proceeds to step 830, at which the calculated air-fuel ratio abyfc is determined by dividing the calculated in-cylinder intake air amount Mcc by the calculated air-fuel ratio Fic.

In a case such as this in which the data extraction condition exists, because the above-described feedback control condition does not exist, the judgment at the previous step 705 is "No," and the air-fuel ratio feedback correct amount DFi is maintained at 0. In this manner, the fuel injection amount Fi set earlier at step 620 is set to be equal to the basic fuel injection amount Fbase. Therefore, the valve opening time $\tau$ of the injector 39 that is determined earlier at step 625 (and therefore that is used in step 825) is set as the time for the purpose of injection of an amount of fuel that is the basic fuel injection amount Fbase. As can be easily understood from the above and from a comparison of step 615 and step 830, the calculated air-fuel ratio abyfc determined at step 830 should coincide with the target air-fuel ratio abyfr used in the earlier step 615.

Next, the CPU 81 proceeds to step 835, at which, similar to the earlier step 710, the detected air-fuel ratio abyfs at the current point in time is determined from the current output vabyfs of the air-fuel ratio sensor 67. The CPU 81 then proceeds to step 840, at which the first combined data is acquired.

Specifically, the CPU 81, acquires and stores the value of the output voltage Vg from the air flow meter 61 used at step 815 as the output voltage data Vg(N), the value of the valve opening time $\tau$ of the injector 39 used in step 825 as the valve opening time data $\tau$(N), the value of the calculated air-fuel ratio abyfc (approximately the target air-fuel ratio abyfr) calculated at step 830 as the calculated air-fuel ratio data abyfc(N), and the value of the detected air-fuel ratio abyfs determined at step 835 as the detected air-fuel ratio data abyfs(N). Because at the current point in time the counter N value is 1, data are stored, respectively, in output voltage data Vg(1), valve opening time data $\tau$(1), calculated air-fuel ratio data abyfc(1) and detected air-fuel ratio data abyfs(1).

Next, the CPU 81 proceeds to step 845, at which a judgment is made as to whether or not the value of counter N is equal to the reference value Nref. By doing this, a judgment is made as to whether or not the number of acquisitions of combined data has reached the reference value number Nref. Because at the current point in time the counter N value is 1, this not having reached the reference value Nref, the CPU 81 makes the judgment of "No" at step 845, and proceeds immediately to step 895, at which this routine is temporarily ended.

Thereafter, as long as the data extraction condition does not exist, and as long as the counter N value, which is incremented by 1 each time at step 810 has not reached the reference value Nref, the processing of steps 810 through 845 is repeatedly executed. As a result, N sets of Vg(N), $\tau$(N), abyfc(N), and abyf(N), which are the combined data, are successively acquired and stored.

When the counter N value reaches the reference value Nref (that is, when the number of acquisitions of combined data reaches the reference value Nref), when the CPU 81 proceeds to step 845, the judgment of "Yes" is made, at which point processing proceeds to step 850, at which the Nref combined data acquired and stored as described above are used to apply a known method of least squares is to the difference between the detected air-fuel ratio abyfs and the calculated air-fuel ratio abyfc (approximately the target air-fuel ratio abyfr), so as to determine and update the first parameters a1, b1, and c1, and the second parameters a2 and b2.

By doing this, the values of a1, b1, c1, a2, and b2 are determined and updated so that the sum of the squares of {abyfc(M)−abyfs(M)} (where M=1, . . . Nref) is minimized. Stated differently, the values of a1, b1, c1, a2, and b2 are determined so that the detected air-fuel ratio abyfs (and therefore the air-fuel ratio abyfr of the gas mixture supplied to the engine) approaches the target air-fuel ratio. The CPU 81 then proceeds to step 855, at which the counter N value is cleared to 0 as preparation for the next execution of the determination of the first and second parameters, after which processing proceeds to step 895, at which this routine is temporarily ended.

In this manner, each time the judgment at step 845 is "Yes," meaning each time the number of acquisitions of combined data reaches the reference value Nref, the values of a1, b1, c1, a2, and b2 are determined and updated at step 850 so that the air-fuel ratio approaches the target air-fuel ratio abyfr. This step 850, can be treated as an example of a parameter determined and setter.

As described above, according to the controller of the first embodiment of the present invention, the intake air amount Ga characteristic with respect to the output voltage Vg of the air flow meter 61 is approximated as the output characteristic of the air flow meter 61, using a second-order polynomial in the output voltage Vg using the parameters a1, b1, and c1, which is Equation (1) (Ga=a1·Vg2+b1 Vg·+c1, refer to step 605). The output characteristic of the air flow meter 61 approximated in this manner is adjusted by the parameters a1, b1, and c1.

In the same manner, the fuel injection amount Fi characteristic with respect to the valve opening time $\tau$ of the injector 39 is approximated as the fuel injection characteristic of the injector 39, using a first-order polynomial in the valve opening time $\tau$ using the parameters a2 and b2, which is Equation (2) (Fi=(a2·$\tau$+b2)·K, refer to step 625). The fuel injection characteristic of the injector 39 approximated in this manner is adjusted by the parameters a2 and b2.

At each prescribed time (each time a "Yes" judgment is made at step 845), the parameters a1, b1, c1, a2, and b2 are determined and updated so that the air-fuel ratio approaches the target air-fuel ratio abyfr. By doing this, after the previous determination, even if the output characteristic of the air flow meter 61 and the fuel injection characteristic of the injector 39 have varied due to aging or the like so that there is a deviation in the air-fuel ratio from the target air-fuel ratio, the output characteristic of the air flow meter 61 (refer to step 605) and the fuel injection characteristic of the injector 39 (refer to step 625) are adjusted by the current determination so that the air-fuel ratio approaches the target air-fuel ratio abyfr. That is, the valve opening time τ of the injector 39 determined based on these characteristics (that is the actual fuel injection amount; refer to step 625) is adjusted so that the air-fuel ratio approaches the target air-fuel ratio abyfr. The deviation in the air-fuel ratio from the target air-fuel ratio abyfr caused by the above-described "air flow meter and injector error" can therefore be suppressed.

The present invention is not restricted to the above-described first embodiment, and it is possible for various modifications to be made within the scope of the present invention. For example, although in the first embodiment the method of least squares is applied to the difference between the detected air-fuel ratio abyfs and the calculated air-fuel ratio abyfc so as to determine and update the parameters a1, b1, c1, a2, and b2, it is alternatively possible, by considering as noted above that the calculated air-fuel ratio abyfc is calculated as the same value or a value that is extremely close to the target air-fuel ratio abyfr, to apply the method of least squares to the difference between the detected air-fuel ratio abyfs and the target air-fuel ratio abyfr so as to determine and update the parameters a1, b1, c1, a2, and b2. In this case, it is possible to omit step 815 through step 830 of FIG. 8, which were required to calculate the calculated air-fuel ratio abyfc.

Furthermore, although in the above-described first embodiment a second-order polynomial in the output voltage Vg is used to approximate the intake air amount Ga characteristics with respect to the output voltage Vg of the air flow meter 61 as the output characteristic of the air flow meter 61, a third-order or high-order polynomial in the output voltage Vg may alternatively be used to perform the approximation. In the same manner, although a first-order polynomial in the valve opening time τ is used to approximate the fuel injection amount Fi characteristic with respect to the valve opening time τ of the injector 39 as the fuel injection characteristic of the injector 39, a second-order or higher order polynomial in the valve opening time τ may alternatively be used to perform the approximation.

In this manner, it is possible the higher the order of the polynomials used, the smaller it is possible to make the error in the output characteristic of the air flow meter 61 and the error in the fuel injection characteristic of the injector 39. However, there is a trend that the higher is the order of the polynomials, the larger is the number of parameters to be determined, and the greater is the calculation load on the CPU 81. Thus, the order of the polynomial used to approximate the air flow meter 61 output characteristic and the order of the polynomial used to approximate the injector 39 fuel injection characteristic should be established with these two points in mind.

Figure 9:
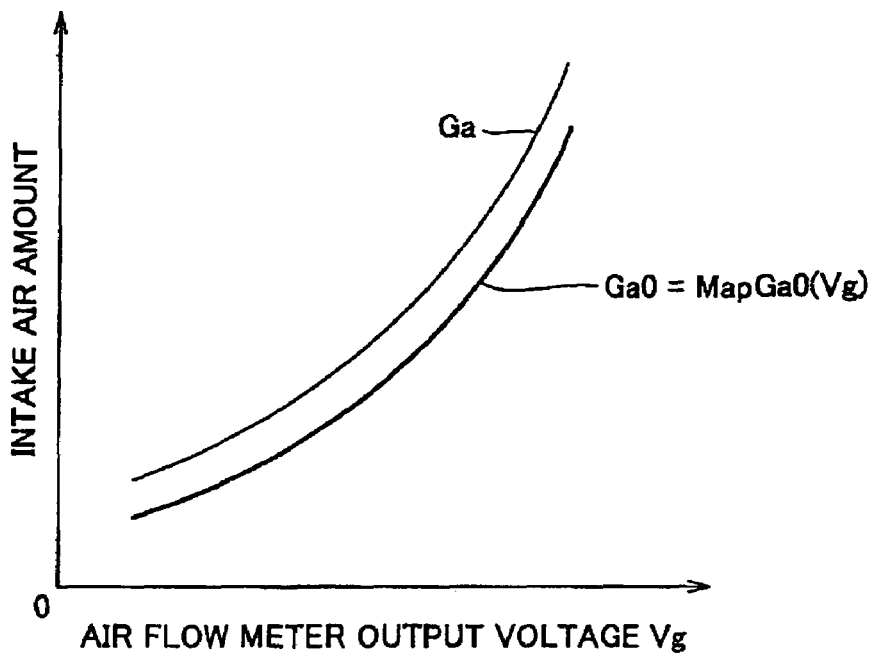
FIG. 9 is a graph showing a table, referenced by the CPU of a controller according to a second embodiment of the present invention, which establishes the relationship between the output voltage of an air flow meter and the table lookup values of the intake air amount.
Figure 10:
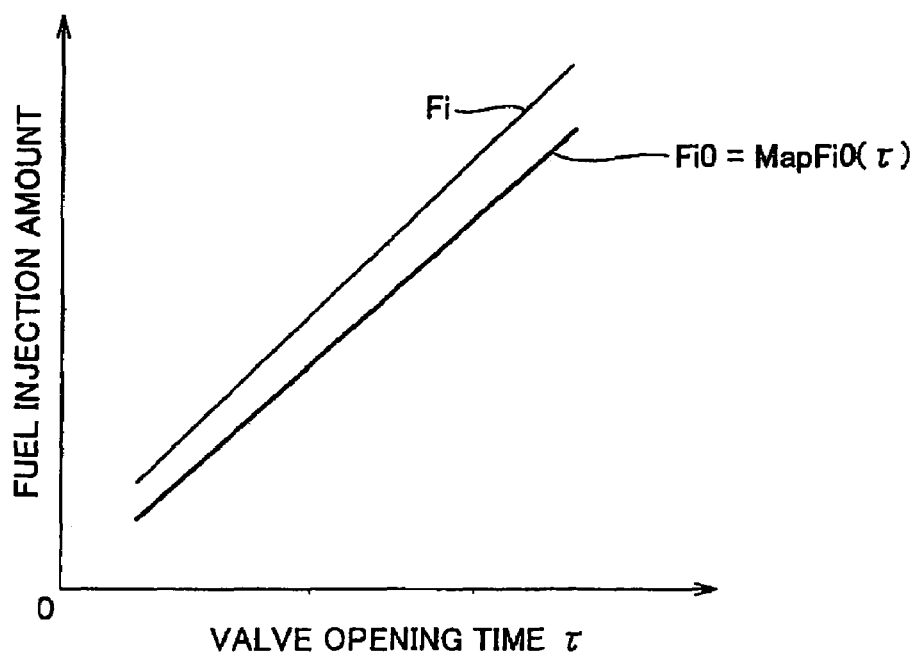
FIG. 10 is a graph showing a table, referenced by the CPU of the controller according to the second embodiment of the present invention, which establishes the relationship between the valve opening time of the injector and the table lookup values of the fuel injection amount.

Next, a controller according to the second embodiment of the present invention will be described. The second embodiment differs from the above-noted first embodiment in that it has a table MapGa0 (refer to FIG. 9) that defines a pre-established relationship between the output voltage Vg of the air flow meter 61 and the intake air amount (Hereinafter "table lookup value Ga0," which is the reference intake air amount) and a table MapFi0 (refer to FIG. 10) that defines a pre-established relationship between the valve opening time τ of the injector 39 and the fuel injection amount (hereinafter "table lookup value Fi0," which is the reference fuel injection amount). These tables MapGa0 and MapFi0 are matched and created beforehand using experimentation and simulation or the like with a master air flow meter 61 and a master injector 39.

Figure 11:
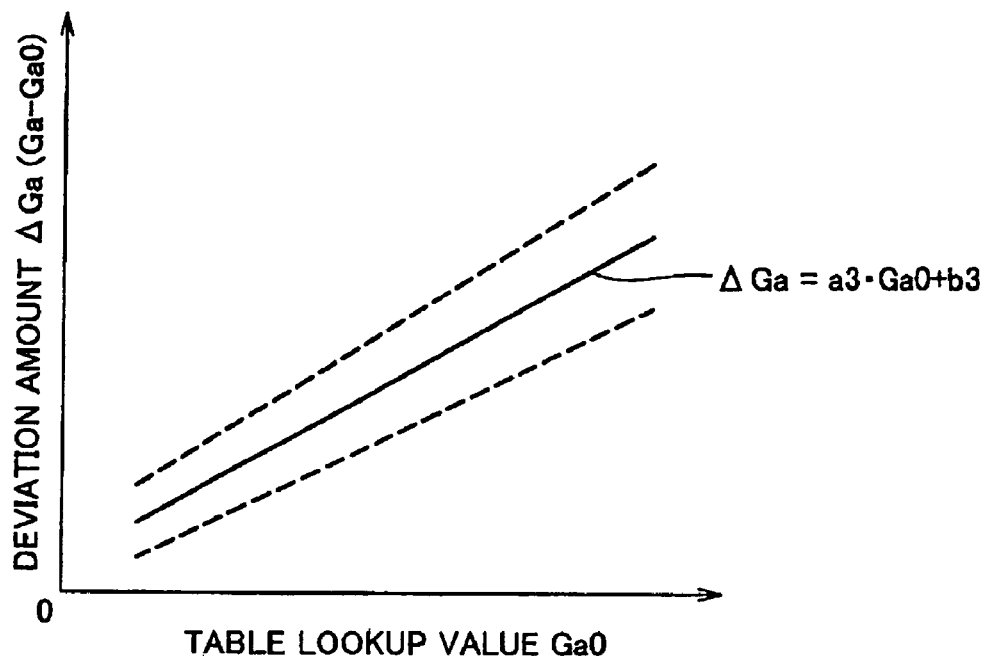
FIG. 11 is a graph showing the relationship between the table lookup value of the intake air amount and amount of deviation (difference between the table lookup value and the true value of the intake air amount), as an example of the air flow meter output characteristic applied by the controller according to the second embodiment of the present invention.
Figure 12:
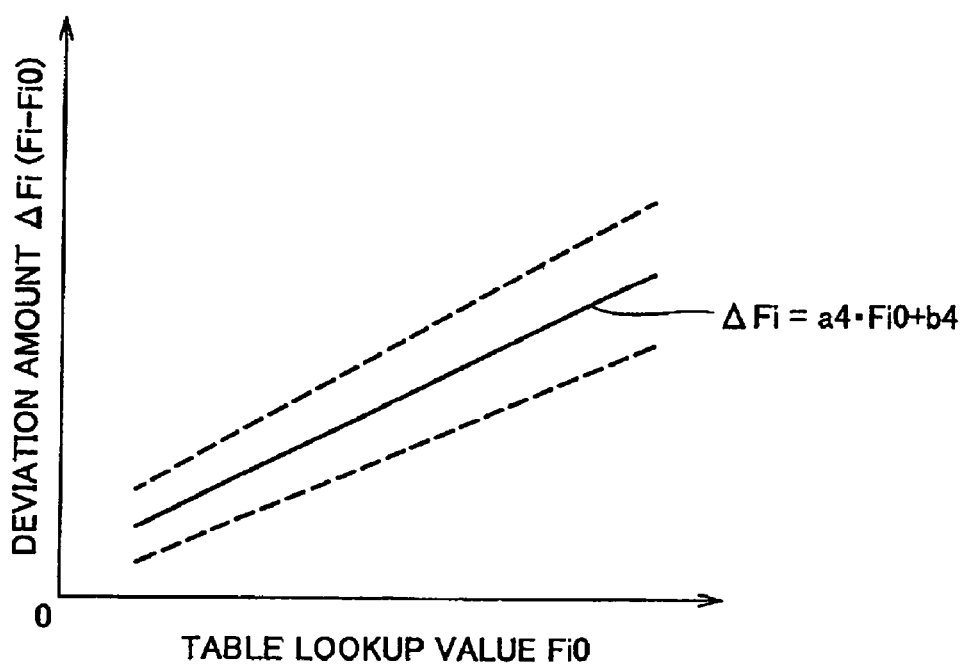
FIG. 12 is a graph showing the relationship between the table lookup value and amount of deviation (difference between the table lookup value and the true value of the fuel injection amount), as an example of the injector fuel injection characteristic used by the controller according to the second embodiment of the present invention.

The second embodiment also differs from the first embodiment in that, as shown in FIG. 11, the characteristic of the deviation amount of "(Ga−Ga0)" of the table lookup value Ga0 with respect to the true intake air amount Ga" (hereinafter "deviation amount ΔGa") with respect to the table lookup value Ga0 is approximated as the air flow meter 61 output characteristic, and that, as shown in FIG. 12, the characteristic of the deviation amount of "(Fi−Fi0)" of the table lookup value Fi0 with respect to the true fuel injection amount Fi (hereinafter "deviation amount ΔFi") with respect to the table lookup value Fi0 is approximated as the fuel injection characteristic of the injector 39.

As shown in FIG. 11, the deviation amount ΔGa is a first-order polynomial in the table lookup value Ga0, with first parameters a3 and b3 as coefficients, this being approximated in accordance with Equation (4) below. This is for the case in which the output characteristic of the air flow meter 61 exhibits a deviation with respect to the output characteristic of a master because of individual differences and aging or the like, in which case this is based on the fact that the characteristic of the deviation amount ΔGa with respect to the table lookup value Ga0 is approximated with relatively good accuracy using a first order polynomial in the table lookup value Ga0.

$$\Delta Ga = a3 \cdot Ga0 + b3 \qquad (4)$$

Equation (4) is an approximation equation that represents the characteristic of the deviation amount ΔGa with respect to the table lookup value Ga0 as an example of the output characteristic of the air flow meter 61 and, as shown by the dashed lines in FIG. 11, the output characteristic of the air flow meter 61 represented by Equation (4) is adjusted in response to the first parameters a3 and b3. In this second embodiment, the deviation amount ΔGa is acquired based on the table lookup value Ga0, acquired from the output voltage Vg of the air flow meter 61 and the table MapGa0, and based on the Equation (4), and the (true) intake air amount Ga is acquired from this deviation amount ΔGa, the table lookup value Ga0, and Equation (5) shown below.

$$Ga = Ga0 + \Delta Ga \qquad (5)$$

As shown in FIG. 12, the deviation amount ΔFi is a first-order polynomial in the table lookup value Fi0, with second parameters a4 and b4 as coefficients, this being approximated as shown in Equation (6) below. This is for the case in which the fuel injection characteristic of the injector 39 exhibits a deviation with respect to the fuel injection characteristic of a master because of individual differences and aging or the like, in which case this is based on the fact that the characteristic of the deviation amount ΔFi with respect to the table lookup value Fi0 is approximated with relatively good accuracy using a first-order polynomial in the table lookup value Fi0.

$$\Delta Fi = a4 \cdot Fi0 + b4 \qquad (6)$$

Equation (6) is an approximation equation that represents the characteristic of the deviation amount ΔFi with respect to the table lookup value Fi0 as an example of the fuel injection characteristic of the injector 39. As shown by the dashed lines in FIG. 12, the fuel injection characteristic of the injector 39 represented by Equation (6) is adjusted by the second parameters a4 and b4.

In the second embodiment, the table lookup value Fi0 is determined based on the equation (8) obtained by eliminating the deviation amount ΔFi from Equations (6) and (7) is solved for the table lookup value Fi0, and the fuel injection amount Fi that is determined from the intake air amount Ga (and therefore the in-cylinder intake air amount Mc) in the same manner as in the first embodiment. The valve opening time τ of the injector 39 corresponding to the determined table lookup Fi0 is determined from the determined table lookup value Fi0 and the table MapFi0. By doing this, the valve opening time τ of the injector 39 that is required to inject an amount of fuel equal to the fuel injection amount Fi is determined.

$$Fi = Fi0 + \Delta Fi \qquad (7)$$

$$Fi0 = (Fi - b4)/(1 + a4) \qquad (8)$$

The second embodiment therefore determines, by this procedure, the valve opening time τ of the injector 39 that is required to inject from the injector 39 a fuel injection amount of Fi. In addition, the apparatus successively determines and updates the first parameters a3 and b3 and second parameters a4 and b4 at each prescribed time by the same procedure as in the first embodiment, so that the air-fuel ratio approaches the target air-fuel ratio abyfr.

Figure 13:
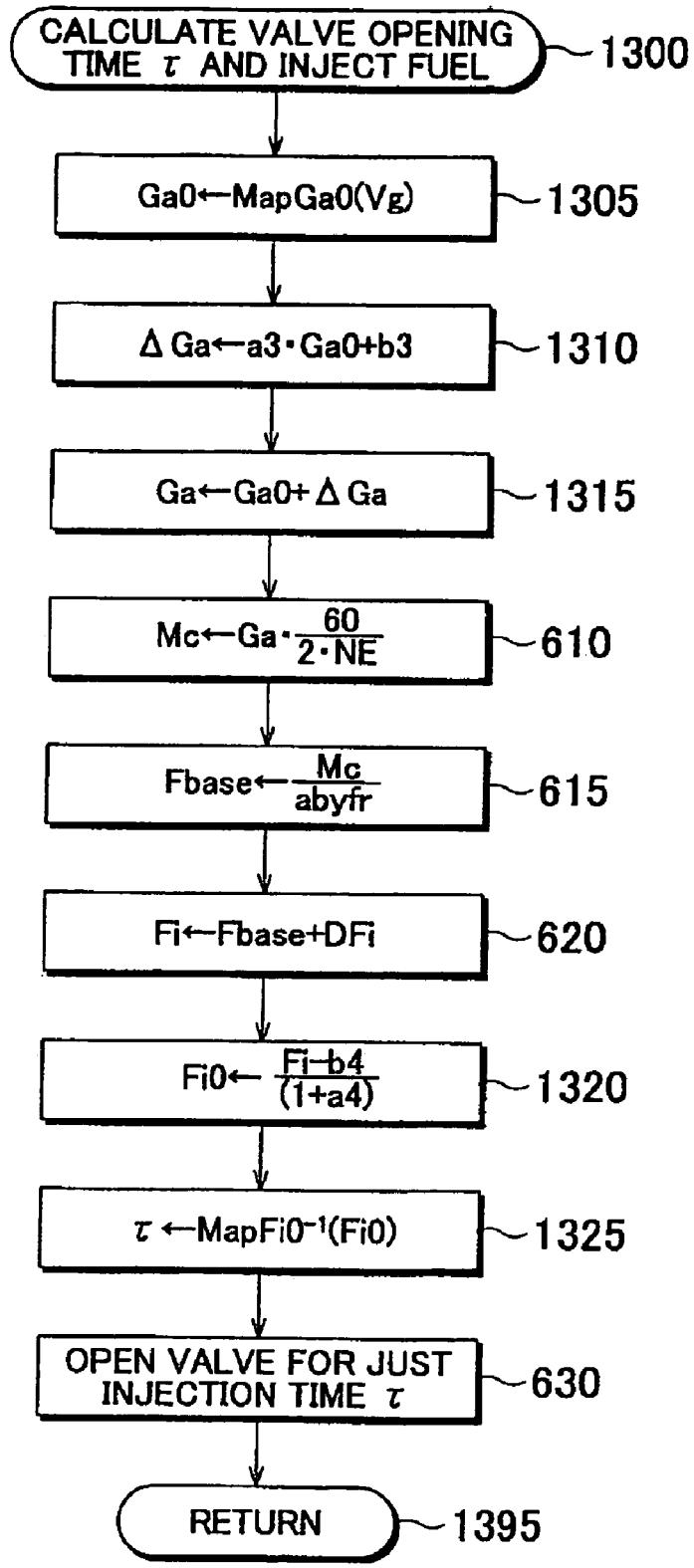
FIG. 13 is a flowchart showing a routine executed by the CPU of the controller according to the second embodiment of the present invention, for the purpose of performing calculation of the valve opening time and fuel injection.
Figure 14:
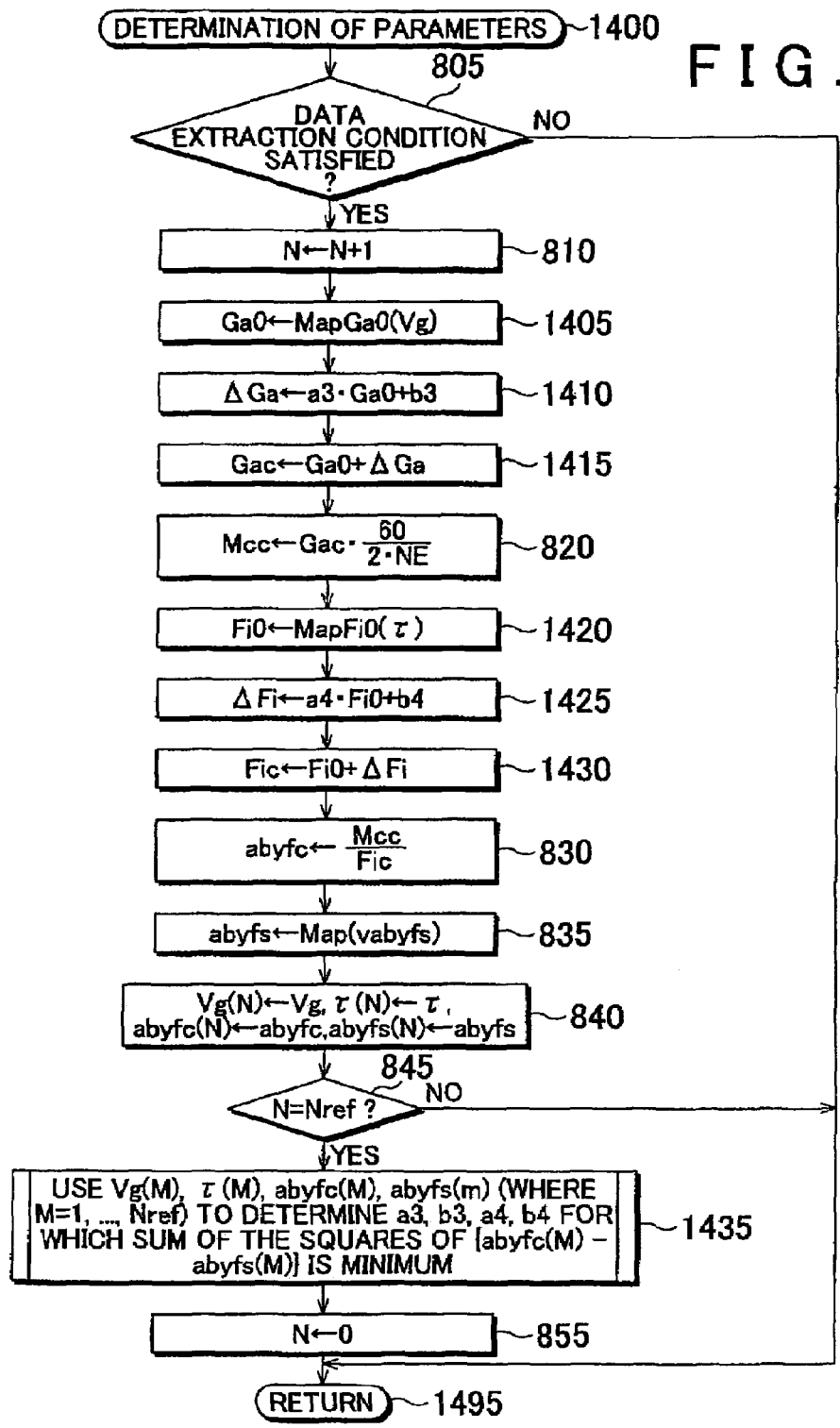
FIG. 14 is a flowchart showing a routine executed by the CPU of the controller according to the second embodiment of the present invention, for the purpose of determining a parameter.

The detailed operation of the apparatus according to the second embodiment will now be described. Of the routines shown in FIG. 6 to FIG. 8, which are executed by the CPU 81 of the first embodiment, the CPU 81 of the apparatus in the second embodiment executes only the routine shown in FIG. 7 as is. In the second embodiment, the CPU 81, instead of executing the routines of FIG. 6 and FIG. 8, which are executed by the CPU 81 of the first embodiment, executes each of the routines, respectively, that are shown by the flowcharts of FIG. 13 and FIG. 14. The routines shown in FIG. 13 and FIG. 14, which are characteristic to the second embodiment, are described below.

The CPU 81 of this apparatus executes the routine shown in FIG. 13 that gives an instruction to calculate the valve opening time τ and perform fuel injection each time a prescribed time elapses in the routine shown in FIG. 13, steps that are the same as steps in FIG. 6 are assigned the same reference numerals as in FIG. 6, rather than being described herein.

The routine shown in FIG. 13 is different from the routine shown in FIG. 6 only in that step 605 of FIG. 6 is replaced by steps 1305, 1310, and 1315, and that step 625 of FIG. 6 is replaced by steps 1320 and 1325. These points of difference are described below.

At step 1305, the table lookup value Ga0 is determined from the output voltage Vg of the air flow meter 61 at the current time and from the table MapGa0. The table MapGa0 is stored in the ROM 82. At step 1310, the deviation amount ΔGa is determined from the table lookup value Ga0 determined as noted above and from the Equation (4). Step 1310 is an example of an air flow meter approximator. At step 1315, the intake air amount Ga is determined from the deviation amount ΔGa determined as noted above, from the table lookup value Ga0 determined as noted above, and from the Equation (5).

At step 1320, the table lookup value Fi0 is determined from the fuel injection amount Fi determined at step 620, and from Equation (8). Step 1320 is an example of an injector approximator. At step 1325, the valve opening time τ of the injector 39 is determined from the table lookup value Fi0 determined as noted above and from table MapFi0 (precisely, from the inverse table MapFi0−1). By doing this, the valve opening time τ of the injector 39 required so that the actual amount of fuel injected is equal to the fuel injection amount Fi determined at step 620 is determined. Step 1325 is an example of a valve opening time determined.

Figure 8:
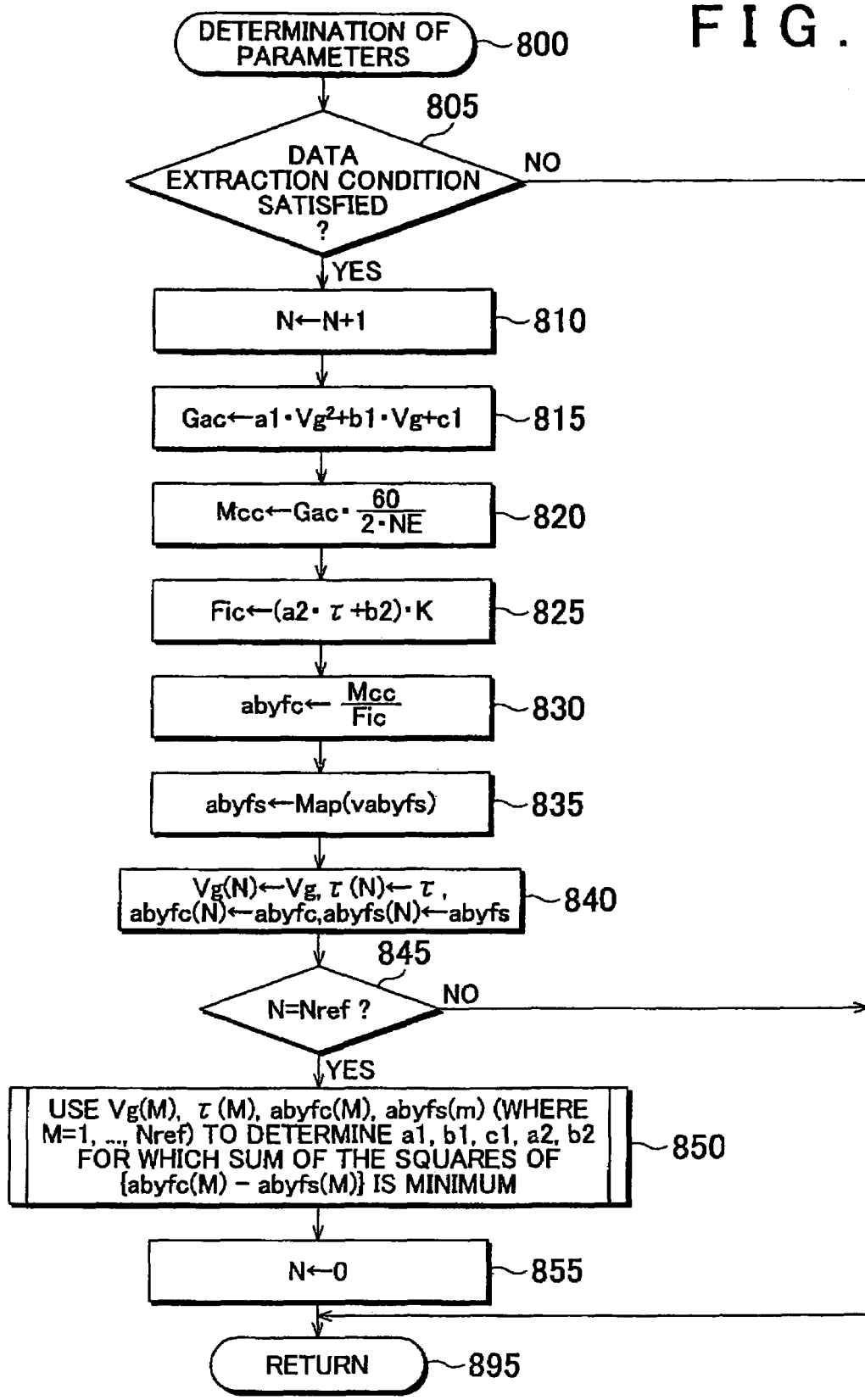
FIG. 8 is a flowchart showing a routine executed by the CPU shown in FIG. 1 for the purpose of determining a parameter.

The routine shown in FIG. 14 differs from the routine shown in FIG. 8 only in that step 815 of FIG. 8 is replaced by steps 1405, 1410, and 1415, that step 825 of FIG. 8 is replaced by steps 1420, 1425, and 1430, and that step 850 of FIG. 8 is replaced by step 1435. These points of difference are described below.

At step 1405 processing is executed that is the same as the above-described step 1305. At step 1410, processing is executed that is the same as the above-described step 1310. At step 1415, similar to the above-described step 1315, the calculated intake air amount Gac is determined based on the table lookup value Ga0 acquired at step 1405, the deviation amount ΔGa acquired at step 1410, and Equation (5).

At step 1420, the table lookup value Fi0 is determined from the latest valve opening time τ of the injector 39 determined at the previous step 1325 and from the table MapFi0. The table MapFi0 is stored in the ROM 82. At step 1425, the deviation amount ΔFi is determined from the table lookup value Fi0 determined as noted above and from Equation (6). At step 1430, the calculated fuel injection amount Fic is calculated based on the table lookup value Fi0, the deviation amount ΔFi, and Equation (7).

The calculated intake air amount Gac (and therefore the calculated in-cylinder intake air amount Mcc) and the calculated fuel injection amount Fic, which are required for the calculation of the calculated air-fuel ratio abyfc at step 830, are calculated in this manner.

At step 1435, which is executed when the condition of step 845 is satisfied, using the same procedure as the above-described step 850, the first parameters a3 and b3 and the second parameters a4 and b4 are determined and updated.

By doing this, the values of a3, b3, a4, and b4 are determined and updated so that the sum of the squares of {abyfc(M)−abyfs(M)} (where M=1, . . . Nref) is minimized. In this manner, each time the judgment of "Yes" is made at step 845, that is, each time the number of acquisitions of combination data reaches the reference value Nref, the values a3, b3, a4, and b4 are determined and updated so that the air-fuel ratio approaches the target air-fuel ratio abyfr. This step 1435 corresponds to a determined and a setter.

As described above, in a controller according to the second embodiment of the present invention, similar to the case of the first embodiment, even if the output characteristic of the air flow meter 61 and the fuel injection characteristic of the injector 39 have varied due to aging and the like, and thus even if a deviation occurs in the air-fuel ratio from the target air-fuel ratio afyfr, the output characteristic of the air flow meter 61 (refer to step 1310) and the fuel injection characteristic of the injector 39 (refer to step 1320) are adjusted by the current determination, so that the air-fuel ratio approaches the target air-fuel ratio abyfr. That is, the valve opening time τ (that is the actual fuel injection amount; refer to step 1325) of the injector 39 determined based on these characteristics is adjusted so that the air-fuel ratio approaches the target air-fuel ratio abyfr. The deviation in the air-fuel ratio from the target air-fuel ratio abyfr caused by the above-described "air flow meter and injector error" can therefore be suppressed.

In addition, the characteristic of the deviation amount ΔGa with respect to the table lookup value Ga0 is approximated as the output characteristic of the air flow meter 61 using a first-order polynomial in the table lookup value Ga0. Therefore, compared to the first embodiment (in which the characteristic of the intake air amount Ga with respect to the output voltage Vg of the air flow meter 61 is approximated as the output characteristic of the air flow meter 61 using a second-order polynomial in the output voltage Vg), the number of parameters to be determined is smaller (a total of 5 in the case of the first embodiment, and a total of 4 in the case of the second embodiment), thereby enabling a reduction in the calculation load on the CPU 81.

The present invention is not restricted to the second embodiment, and it is possible for various modifications to be made within the scope of the present invention. For example, in the second embodiment as well, similar to the case of the first embodiment, by considering that the calculated air-fuel ratio abyfc is the same value or a value that is extremely close to the target air-fuel ratio abyfr, it is possible to apply the method of least squares to the difference between the detected air-fuel ratio abyfs and the target air-fuel ratio abyfr so as to determine and update the parameters a3, b3, a4, and b4. In this case, it is possible to omit steps 1405 to 1415, step 820, steps 1420 to 1430 and step 830 in FIG. 14, which were required to calculate the calculated air-fuel ratio abyfc.

Also, in the second embodiment, although a first-order polynomial in the table lookup value Ga0 is used to approximate the characteristic of the deviation amount ΔGa with respect to the table lookup value Ga0 as the output characteristic of the air flow meter 61, it is alternatively possible to use a polynomial of the second or a higher order in the deviation amount ΔGa0 to perform the approximation. In the same manner, although a first-order polynomial in the lookup table value Fi0 is used to approximate the characteristic of the deviation amount ΔFi with respect to the table lookup value Fi0 as the fuel injection characteristic of the injector 39, it is alternatively possible to use a polynomial of second or higher order in the table lookup value Fi0 to perform the approximation.

Additionally, in the second embodiment it is also possible to approximate the characteristic of the deviation value ΔGa with respect to the output voltage Vg of the air flow meter 61 as the output characteristic of the air flow meter 61 using a first-order polynomial in the output voltage Vg. In the same manner, it is also possible to approximate the characteristic of the deviation value ΔFi with respect to the valve opening time τ of the injector 39 as the fuel injection characteristic of the injector 39 using a first-order polynomial in valve opening time τ.

Additionally, in the first and second embodiments, the various parameter values are determined so that the larger the degree of the dispersion becomes in the combination of the output voltage data Vg(N) and valve opening time τ(N), which are part of the combination data, the more uniformly the air-fuel ratio approaches the target air-fuel ratio over a wider range of operating conditions. Therefore, it is possible to add to the data extraction conditions of step 805, for example, the condition that at least one of the current output voltage Vg of the air flow meter 61 and the valve opening time τ of the injector 39 at the current point in time (the latest determined at step 625 or at step 1325) exhibits at least a prescribed deviation from the corresponding value at the previous-data extraction (the point in time of the previous execution of step 840).

In the first and second embodiments, a "limit current type oxygen concentration sensor" having the output characteristic shown in FIG. 2 is used as the air-fuel ratio sensor 67 disposed in the exhaust passage upstream from the upstream catalyst 53. However, it is alternatively possible to use a "density cell type oxygen concentration sensor" having the output characteristic shown in FIG. 3 as the oxygen concentration sensor 68 disposed in the exhaust passage downstream from the upstream catalyst 53. In this case, when parameter determining is performed, it is preferable, in the Nref combination data acquired as described above, to use the theoretical air-fuel ratio atoich (constant) as the detected air-fuel ratio data abyfs(N), in place of the air-fuel ratio corresponding to the oxygen concentration sensor output value.

This is based on the following reason. Specifically, with an oxygen concentration sensor having the characteristic shown in FIG. 3, if the air-fuel ratio of the exhaust gas being detected is even slightly richer than the theoretical air-fuel ratio the output value thereof becomes the above-noted maximum output value max, and if the air-fuel ratio is even slightly leaner than the theoretical air-fuel ratio the output value thereof becomes the above-noted minimum output value min. As a result of this characteristic, the output value of the oxygen concentration sensor tends to exhibit periodic alternating variations between the two values, i.e., the maximum output value max and the minimum output value min. Therefore, if the air-fuel ratio itself corresponding to the output value of the oxygen concentration sensor is used as the detected air-fuel ratio data abyfs(N) in parameter determining, there is a risk of a loss of accuracy in parameter determination.

Over time, the average value of the air-fuel ratio, which corresponds to the output value from the oxygen concentration sensor, tends to become extremely close to the theoretical air-fuel ratio stoich. If this is considered, in the case that a "density cell type oxygen concentration sensor" is used as the air-fuel ratio sensor disposed in the exhaust passage upstream from the upstream catalyst 53, it is preferable to use the theoretical air-fuel ratio atoich (constant) in place of the air-fuel ratio that corresponds to the output value of the oxygen concentration sensor.

While some embodiments of the invention have been illustrated above, it is to be understood that the invention is not limited to details of the illustrated embodiments, but may be embodied with various changes, modifications or improvements, which may occur to those skilled in the an, without departing from the spirit and scope of the invention.

What is claimed is:

1. A controller for an internal combustion engine, comprising:
   an air flow meter that outputs a value responsive to an intake air amount, the intake air amount being an amount of air passing through an air intake passage of the internal combustion engine;
   an air-fuel ratio sensor that is disposed in an exhaust passage of the internal combustion engine, and detects an exhaust air-fuel ratio, the exhaust air-fuel ratio being an air-fuel ratio of gas passing through the exhaust air passage;
   an injector that injects fuel by opening a valve;
   an air flow meter approximator that approximates an output characteristic of the air flow meter using at least one first parameter;
   an injector approximator that approximates a fuel injection characteristic of the injector using at least one second parameter,
   a valve opening time determined that determines a valve opening time of the injector based on the value output by the air flow meter, the output characteristic of the air flow meter approximated by the air flow meter approximator, and the fuel injection characteristic of the injector approximated by the injector approximator, wherein the valve opening time is a time for injecting an amount of fuel required so that an air-fuel ratio of a gas mixture supplied to the internal combustion engine coincides with a target air-fuel ratio;

a parameter determined that determines at least one first determined parameter and at least one second determined parameter, based on the exhaust air-fuel ratio detected by the air-fuel ratio sensor, so that the exhaust air-fuel ratio approaches the target air-fuel ratio; and a parameter setter that sets the at least one first determined parameter determined by the parameter determiner as the at least one first parameter used by the air flow meter approximator, and sets the at least one second determined parameter determined by the parameter determiner as the at least one second parameter used by the injector approximator.

2. The controller for the internal combustion engine according to claim 1, wherein the air flow meter approximator approximates the intake air amount with respect to the value output from the air flow meter as the output characteristic of the air flow meter.

3. The controller for the internal combustion engine according to claim 2, wherein the air flow meter approximator approximates the intake air amount with respect to the value output from the air flow meter using a second-order polynomial, and uses coefficients of terms of the second-order polynomial as the at least one first parameter.

4. The controller for the internal combustion engine according to claim 1, wherein the air flow meter approximator comprises a storage section that stores a pre-established relationship between the value output by the air flow meter and the intake air amount, and the air flow meter approximator approximates a deviation amount of a reference intake air amount with respect to a true intake air amount as the output characteristic of the air flow meter, the reference intake air amount being the intake air mount acquired from the value output from the air flow meter and the relationship stored in the storage section.

5. The controller for the internal combustion engine according to claim 4, wherein the air flow meter approximator approximates the deviation amount of the reference intake air amount with respect to the true intake air amount using a first-order polynomial, and uses coefficients of terms of the first-order polynomial as the at least one first parameter.

6. The controller for the internal combustion engine according to claim 1, wherein the injector approximator approximates a fuel injection amount, which is an amount of fuel to be injected from the injector, with respect to the valve opening time of the injector as the fuel injection characteristic of the injector.

7. The controller for the internal combustion engine according to claim 6, wherein the injector approximator approximates the fuel injection amount with respect to the valve opening time of the injector using a first-order polynomial, and uses coefficients of the terms of the first-order polynomial as the at least one second parameter.

8. A controller for an internal combustion engine according to claim 1, wherein the injector approximator comprises a storage section storing a preestablished relationship between the valve opening time of the injector and a fuel injection amount, which is an amount of fuel to be injected from the injector, the injector approximator approximates a deviation amount of a reference fuel injection amount with respect to a true fuel injection amount as the fuel injection characteristic of the injector, the reference fuel injection amount being the fuel injection amount acquired from the injector valve opening time and the relationship stored in the storage section.

9. The controller for the internal combustion engine according to claim 8, wherein the injector approximator approximates the deviation amount of the reference fuel injection amount with respect to the true fuel injection amount using a first-order polynomial, and uses coefficients of terms of the first-order polynomial as the at least one second parameter.

10. The controller for the internal combustion engine according to claim 1, wherein the parameter determined determines the at least one first determined parameter and at least one second determined parameter so as to cause the exhaust fuel-air ratio to approach the target air-fuel ratio, based on a combination of the exhaust fuel-air ratio detected by the air-fuel ratio sensor, the value output from the air flow meter, and the valve opening time of the injector determined by the valve opening time determined.

11. The controller for the internal combustion engine according to claim 10, wherein the combination includes a plurality of combinations at a plurality of times, and wherein the parameter determined applies a method of least squares with respect to a difference between the target air-fuel ratio and the exhaust fuel-air ratio based on the plurality of combinations so as to determine the at least one first determined parameter and the at least one second determined parameter.

12. A method for controlling an internal combustion engine having an air flow meter outputting a value responsive to an intake air amount, the intake air amount being air passing through an air intake passage of the internal combustion engine, an air-fuel ratio sensor, disposed in an exhaust passage of the internal combustion engine, detecting an exhaust air-fuel ratio, the exhaust air-fuel ratio being an air-fuel ratio of gas passing through the exhaust air passage and, an injector injecting fuel by opening a valve, the method comprising:

approximating an output characteristic of the air flow meter using at least one first parameter;

approximating a fuel injection characteristic of the injector using at least one second parameter, determining a valve opening time of the injector based on the value output by the air flow meter, the approximated output characteristic of the air flow meter, and the approximated fuel injection characteristic of the injector, wherein the valve opening time is a time for injecting an amount of fuel required so that an air-fuel ratio of a gas mixture supplied to the internal combustion engine coincides with a target air-fuel ratio;

determining, based on the exhaust air-fuel ratio detected by the air-fuel ratio sensor, at least one first determined parameter and at least one second determined parameter so that the exhaust air-fuel ratio approaches the target air-fuel ratio; and setting the at least one first determined parameter as the at least one first parameter and setting the at least one second determined parameter as the at least one second parameter.

* * * * *